US008560858B2

(12) United States Patent
Schneider

(10) Patent No.: US 8,560,858 B2
(45) Date of Patent: Oct. 15, 2013

(54) SECURE SESSION IDENTIFIERS

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1016 days.

(21) Appl. No.: 12/156,259

(22) Filed: May 29, 2008

(65) Prior Publication Data

US 2009/0300352 A1    Dec. 3, 2009

(51) Int. Cl.
*H04L 9/32* (2006.01)

(52) U.S. Cl.
USPC .......................................... 713/181; 713/168

(58) Field of Classification Search
USPC ........................................ 713/168–170, 181
See application file for complete search history.

(56) References Cited

U.S. PATENT DOCUMENTS

| | | | |
|---|---|---|---|
| 5,349,642 A * | 9/1994 | Kingdon ...................... | 713/161 |
| 7,246,236 B2 * | 7/2007 | Stirbu .......................... | 713/168 |
| 7,346,773 B2 * | 3/2008 | Cam-Winget et al. ......... | 713/155 |
| 2002/0116341 A1 * | 8/2002 | Hogan et al. ..................... | 705/64 |
| 2003/0041241 A1 * | 2/2003 | Saito .............................. | 713/169 |
| 2004/0034773 A1 * | 2/2004 | Balabine et al. .............. | 713/168 |
| 2004/0047308 A1 * | 3/2004 | Kavanagh et al. ............. | 370/328 |
| 2004/0117262 A1 * | 6/2004 | Berger et al. ................... | 705/16 |
| 2005/0132192 A1 * | 6/2005 | Jeffries et al. ................. | 713/169 |
| 2009/0061820 A1 * | 3/2009 | Patel et al. ..................... | 455/411 |

* cited by examiner

*Primary Examiner* — Nirav B Patel
(74) *Attorney, Agent, or Firm* — Lowenstein Sandler LLP

(57) ABSTRACT

An apparatus and a method for an authentication protocol. In one embodiment, a server generates a sequence number, and a server message authentication code based on a server secret key. The server sends the sequence number, an account identifier, and the server message authentication code to the client. The client generates a client message authentication code over the sequence number, a request specific data, and a shared secret key between the client and the server. The client sends a request to the server. The request includes the sequence number, the account identifier, the server message authentication code, the request specific data, and the client message authentication code. The server determines the validity of the client request with the shared secret key.

17 Claims, 5 Drawing Sheets

SECURE SESSION IDENTIFIERS

TECHNICAL FIELD

Embodiments of the present invention relate to computing systems, and more particularly, to authentication over an insecure channel.

BACKGROUND

Some websites do not support Secure Session Layer (SSL) and as such exploits like session hijacking may be possible. For example, a user logged in on a web-based mail account may perform a search on that account. An eavesdropper on the network may be able to impersonate the user and read the user's email.

Thus, a need exists for a technique for a remote connection to authenticate itself over an insecure channel without disclosing a shared secret.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for an authentication protocol. In one embodiment, a server generates a sequence number, a server message authentication code based on a server secret available only to the server. The server sends the sequence number, an account identifier, and the server message authentication code to the client. The client generates a client message authentication code using the sequence number and any specific request data using a shared secret key at the client. The client sends a request to the server. The request includes the sequence number, the account identifier, the server message authentication code, any specific request data, and the client message authentication code. The server determines the validity of the client request with the shared secret key.

Figure 1:
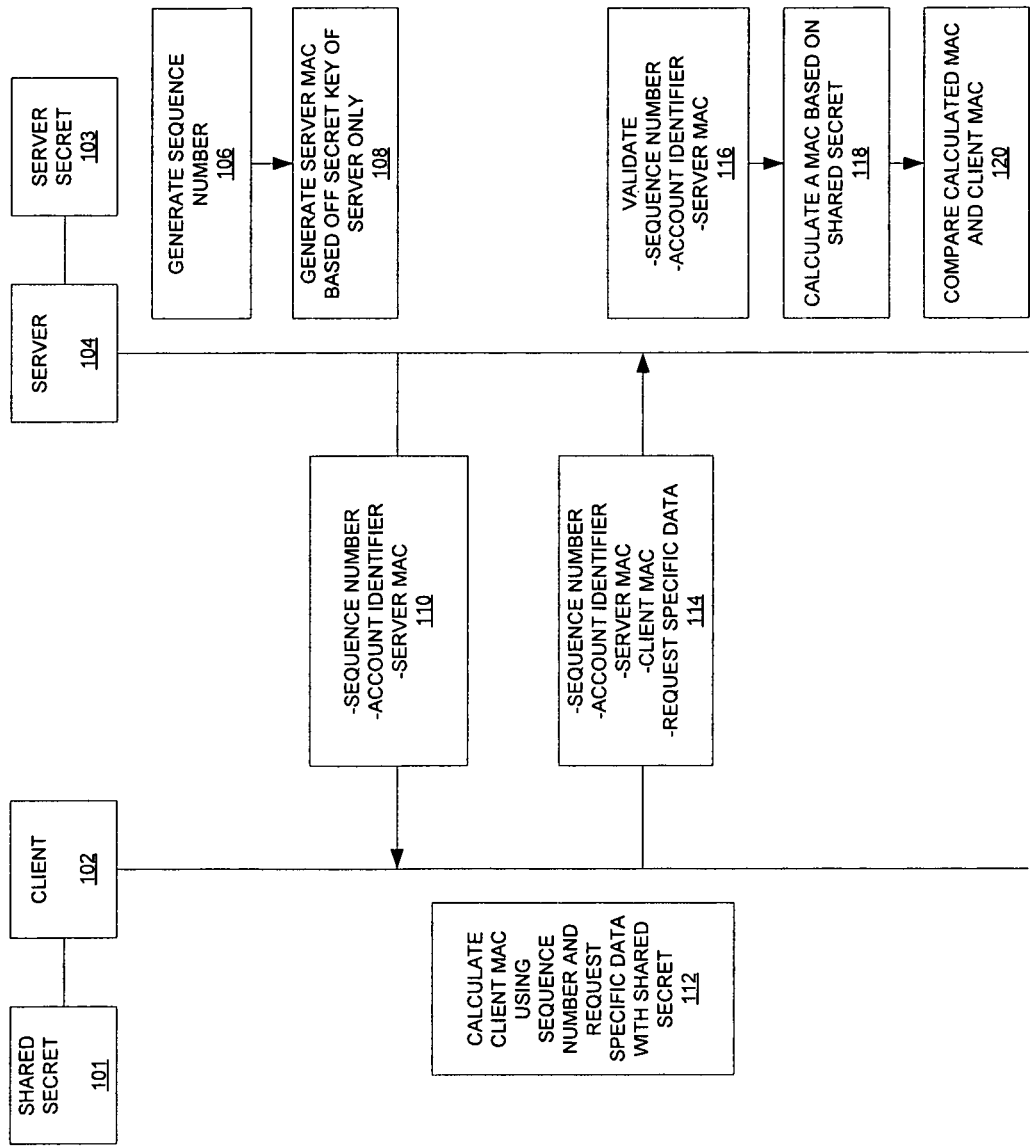
FIG. 1 is a ladder diagram illustrating one embodiment of a process for authentication over an unsecured channel.

FIG. 1 is a ladder diagram illustrating one embodiment of a process for authentication over an unsecured channel between a client 102 and a server 104. At this point, client 102 and server 104 already successfully negotiated a shared secret key 101 without disclosing what it is. This could either take the form of Diffie-Hellman key exchange, or they could just use a hashed password. This value must be stored on client 102, but not sent back and forth to server 104.

Server 104 also has a server secret 103 only available to server 104. Once the shared secret key 101 is negotiated/established, server 104 generates an arbitrary sequence number at 106. It also generates a server message authentication code (MAC) over the generated sequence number and an account identifier at 108 using the server secret 103. Server 104 sends to client 102, the generated sequence number, the account identifier, and the server MAC at 110.

For every request client 102 makes, client 102 takes the current sequence number and any request specific data (for example, the type and target of the request, or any request parameters), and calculates at 112 a client MAC over the current sequence number and any request specific data with the shared secret key 101 that client 102 shares with server 104. Client 102 sends a request comprising the sequence number, the account identifier, the server MAC, the client MAC back, and any request specific data back to server 104.

When server 104 receives the request, server 104 validates that the original parameters (sequence number, account identifier, and server MAC) have not been tampered with at 116. Also, server 104 verifies that it was not processed this request before.

Server 104 further determines whether the client MAC is valid by computing a MAC based on the shared secret key at 118 and comparing it with the client MAC at 120.

Assuming the request passes this authentication, server 104 sends a new sequence number, the account ID, and a new MAC to client 102.

Figure 2:
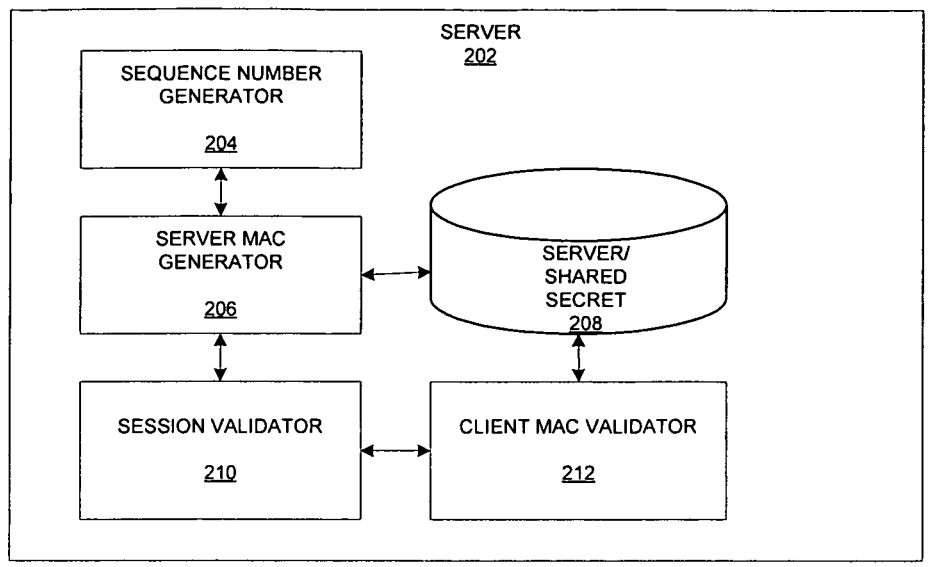
FIG. 2 is a block diagram illustrating one embodiment of a server for authentication over an unsecured channel.

FIG. 2 is a block diagram illustrating one embodiment of a server 202 for authentication over an unsecured channel. Server 202 includes at least a sequence number generator 204, a server MAC generator 206, a storage 208, a session validator 210, and a client MAC validator 212.

Sequence number generator 204 is configured to generate an arbitrary sequence number. Server MAC generator 206 is configured to generate a server MAC over the sequence number and an account identifier using a server secret. Storage 208 stores a shared secret key, and a server secret only available to the server. In one embodiment, the shared secret key between the server and the client is established over an insecure communication channel using an anonymous cryptographic key agreement protocol, wherein the server and the client have no prior knowledge of each other.

Client MAC validator 212 is configured to validate the client MAC. Client MAC validator 212 first calculates a MAC based on the shared secret and the sequence number, then compares the calculated MAC with the client MAC to determine the validity of the client.

Session validator 210 is configured to validate a session with the client based on the validity of the client MAC. In one embodiment, the client MAC is computed based on the shared secret key, the sequence number, and any request specific data (for example, the type and target of the request, or any request parameters). Session validator 210 is also configured to validate that the sequence number, the account identifier, and the server MAC in the request from the client have not been tampered with, and that server 202 has not previously processed a prior identical request from the client.

In another embodiment, sequence number generator 204 is configured to send a new sequence number upon successful validation of the client.

Figure 3:
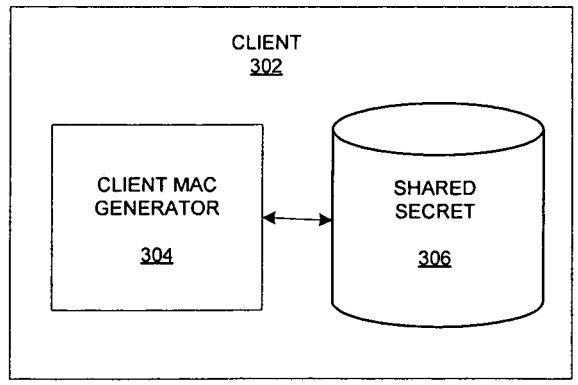
FIG. 3 is a block diagram illustrating one embodiment of a client for authentication over an unsecured channel.

FIG. 3 is a block diagram illustrating one embodiment of a client 302 for authentication over an unsecured channel. Client 302 includes at least a client MAC generator 304 and a storage 306 storing a shared secret key with server 202.

Client MAC generator 304 is configured to receive the sequence number, the account identifier, and the server MAC from server 202. Client MAG generator 304 then computes a client MAC using the sequence number received from server 202, any request specific data (for example, the type and target of the request, or any request parameters), and the shared secret stored in storage 306.

In an another embodiment, client 302 may include a server authenticator (not shown). If the client needs to authenticate the server, the protocol can be extended by including a server identifier and a MAC over the server identifier and sequence number using the shared secret. The client calculates their own copy of the MAC, and verifies the server's identifier is what is expected.

Figure 4:
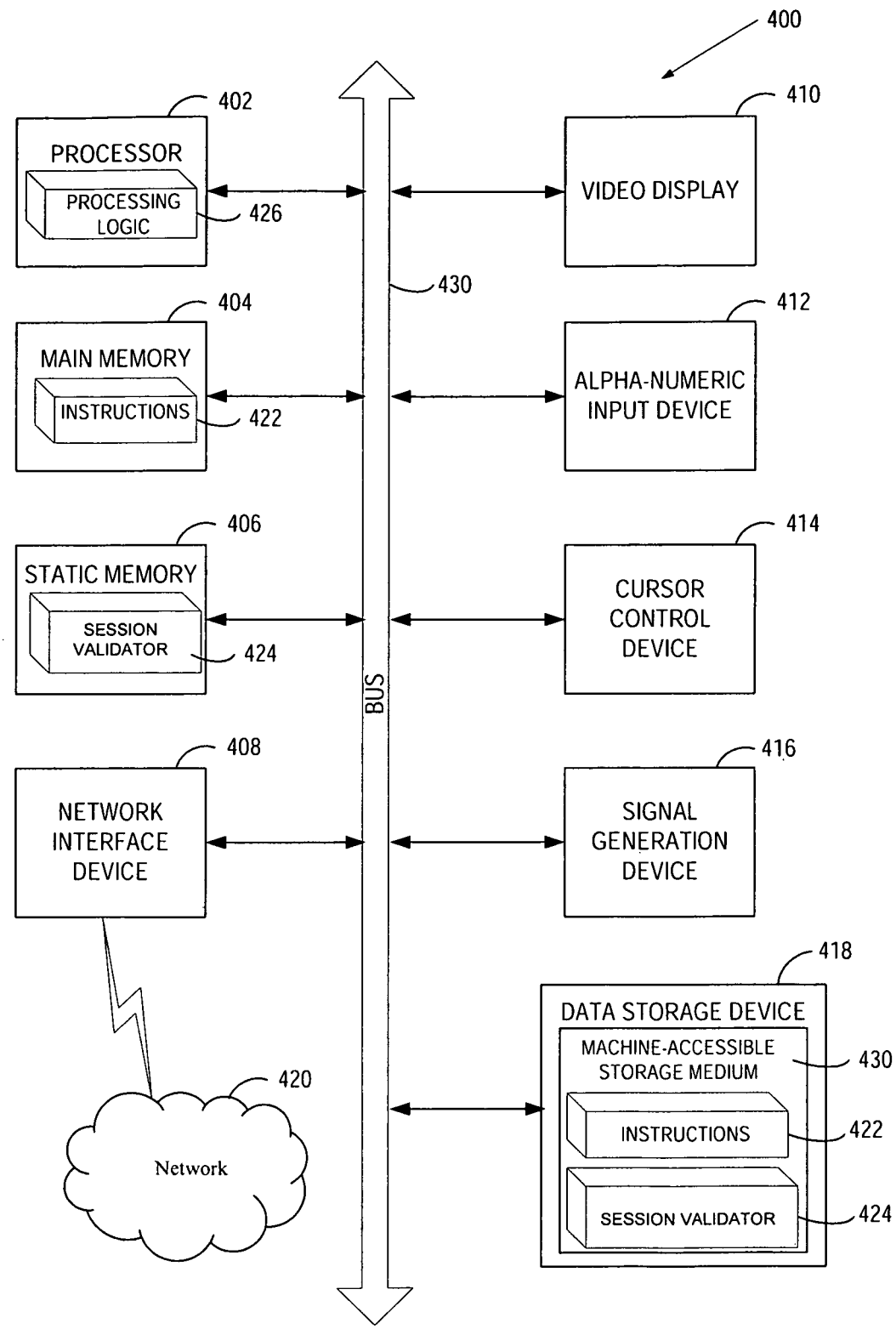
FIG. 4 is a block diagram illustrating an example of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 430 on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-accessible storage media. The software 422 may further be transmitted or received over a network 420 via the network interface device 408.

The machine-accessible storage medium 430 may also be used to store the session validator 424 as presently described. The session validator 424 may also be stored in other sections of computer system 400, such as static memory 406.

While the machine-accessible storage medium 430 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

Figure 5:
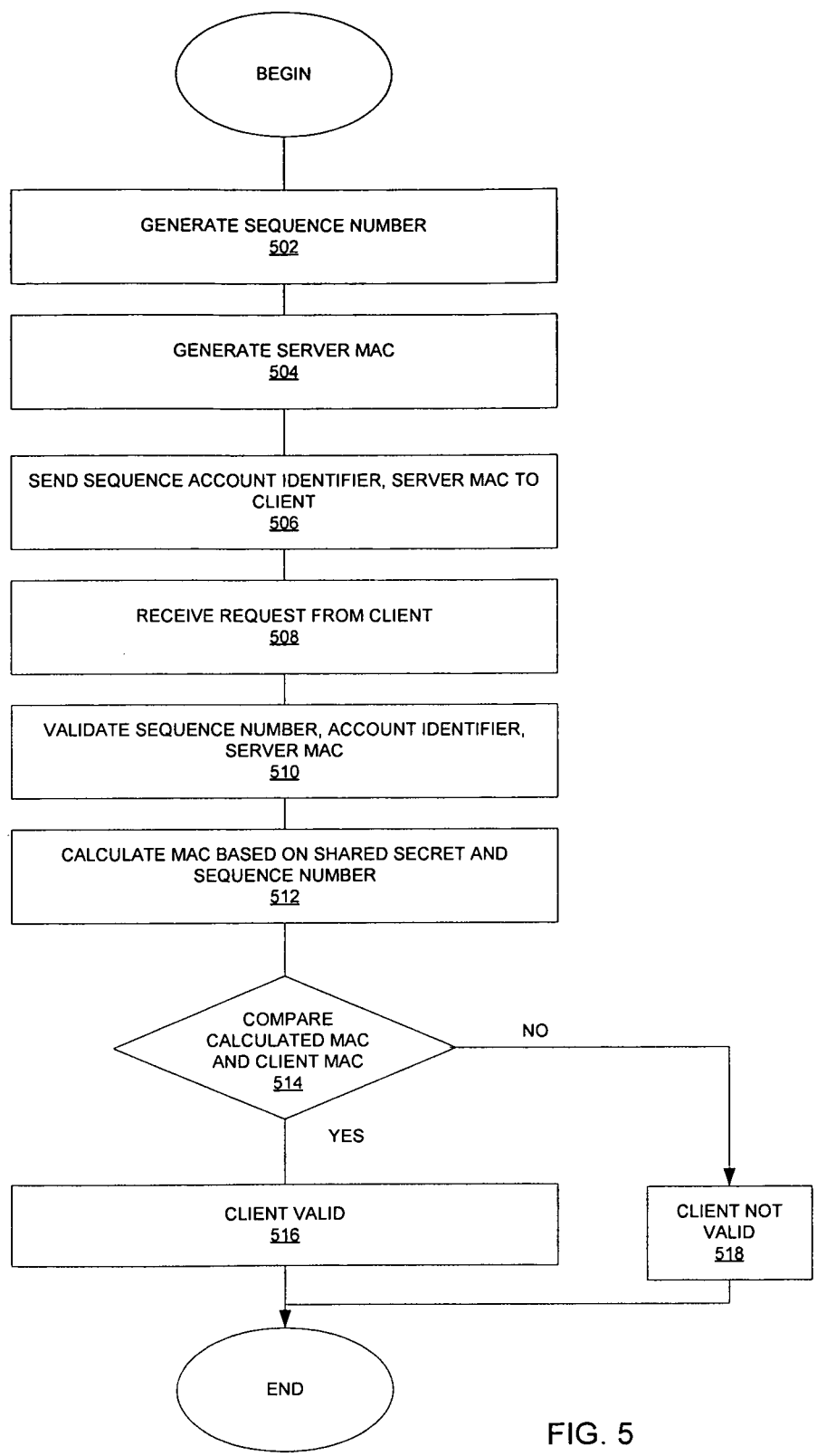
FIG. 5 is a flow diagram illustrating a method for authenticating a communication from a server over an unsecured channel.

FIG. 5 is a flow diagram illustrating a method for authenticating a communication with a client over an unsecured channel. At 502, a server generates an arbitrary sequence number. At 504, server calculates a server message authentication code over the sequence number and an account identifier using a server secret only available to the server. At 506, the sequence number, an account identifier, and the server message authentication code are sent to the client. At 508, a request is received from the client. The request includes the sequence number, the account identifier, the server message authentication code, a client message authentication code, and any request specific data (for example, the type and target of the request, or any request parameters). In one embodiment, the client message authentication code is computed based on the shared secret key and the sequence number.

At 510, the server validates that the sequence number, the account identifier, and the server message authentication code in the request have not been tampered with, and that the server has not previously processed a prior identical request from the client.

At 512, the server calculates a message authentication code based on the shared secret and the sequence number. At 514, the server compares the calculated message authentication code with the client message authentication code to determine the validity of the client. Upon successful validation of the client at 516, the server sends a new sequence number, the account identifier, and a new server message authentication code. If the calculated message authentication code does not match the received client message authentication code in the client request, the client is found to be not valid at 518.

In one embodiment, the server and the client have already established the shared secret key over an insecure communication channel using an anonymous cryptographic key agreement protocol, wherein the server and the client have no prior knowledge of each other.

Figure 6:
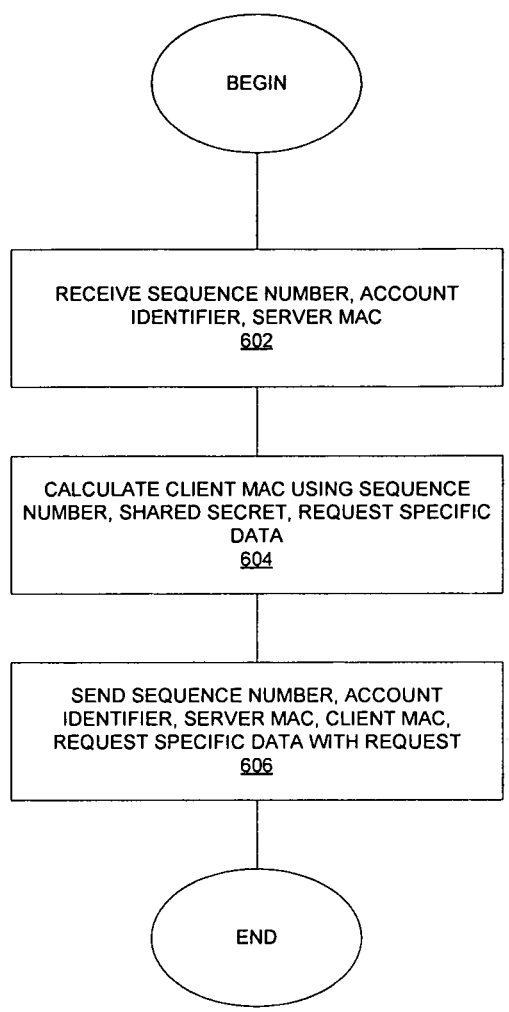
FIG. 6 is a flow diagram illustrating a method for authenticating a communication from a client over an unsecured channel.

FIG. 6 is a flow diagram illustrating a method for authenticating a communication from a server over an unsecured channel. At 602, a client receives a sequence number, an account identifier, and a server message authentication code. In one embodiment, the server and the client have already established the shared secret over an insecure communication channel using an anonymous cryptographic key agreement protocol, wherein the server and the client have no prior knowledge of each other.

At 604, the client computes a client message authentication code using the received sequence number, the shared secret, and any request specific data (for example, the type and target of the request, or any request parameters). At 606, the client sends a request including the sequence number, the account identifier, the server message authentication code, and the client message authentication code.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   generating a sequence number at a server;
   generating a server message authentication code in view of the sequence number and a server secret key, the server secret key available only to the server;
   sending the sequence number, an account identifier, and the server message authentication code to a client;
   receiving a request from the client, the request comprising the sequence number, the account identifier, the server message authentication code, and a client message authentication code; and
   validating, by a processing device, using the client message authentication code, that the sequence number, the account identifier and the server message authentication code in the request have not been tampered with and that the server has not previously processed a prior identical request from the client.

2. The computer-implemented method of claim 1 comprising:
   establishing a shared secret key between the server and the client over an insecure communication channel using an anonymous cryptographic key agreement protocol, wherein the server and the client have no prior knowledge of each other.

3. The computer-implemented method of claim 2 wherein the server message authentication code is computed in view of the sequence number and an account identifier.

4. The computer-implemented method of claim 2 wherein the client message authentication code is computed over the sequence number, and request specific data using the shared secret key.

5. The computer-implemented method of claim 1 further comprising:
   calculating a message authentication code in view of the shared secret and the sequence number;
   comparing the calculated message authentication code with the client message authentication code; and
   determining the validity of the request in view of the comparison.

6. The computer-implemented method of claim 5 further comprising:
   upon successful validation of the request, sending a new sequence number, the account identifier, and a new server message authentication code.

7. A non-transitory computer-accessible storage medium including data that, when accessed by a processing device, cause the processing device to perform operations comprising:
   generating a sequence number at a server;
   generating a server message authentication code in view of the sequence number and a server secret key, the server secret key available only to the server;
   sending the sequence number, an account identifier, and the server message authentication code to a client;
   receiving a request from the client, the request comprising the sequence number, the account identifier, the server message authentication code, and a client message authentication code; and validating, by the processing device using the client message authentication code, that the sequence number, the account identifier and the server message authentication code in the request have not been tampered with and that the server has not previously processed a prior identical request from the client.

8. The non-transitory computer-accessible storage medium of claim 7 wherein the operations further comprise: establishing a shared secret key between the server and the client over an insecure communication channel using an anonymous cryptographic key agreement protocol, wherein the server and the client have no prior knowledge of each other.

9. The non-transitory computer-accessible storage medium of claim 8 wherein the server message authentication code is computed in view of the sequence number and an account identifier.

10. The non-transitory computer-accessible storage medium of claim 8 wherein the client message authentication code is computed over the sequence number, and request specific data using the shared secret key.

11. The non-transitory computer-accessible storage medium of claim 8 wherein the operations further comprise:
calculating a message authentication code in view of the shared secret and the sequence number;
comparing the calculated message authentication code with the client message authentication code; and
determining the validity of the request in view of the comparison.

12. The non-transitory computer-accessible storage medium of claim 11 wherein the operations further comprise:
upon successful validation of the request, sending a new sequence number, the account identifier, and a new server message authentication code.

13. A server comprising:
a sequence number generator, executable by a processing device, to generate a sequence number;
a server message authentication code generator coupled to the sequence number generator, the server message authentication code generator to generate a server message authentication code over the sequence number and an account identifier with a server secret key, the server secret key available only to the server;
a storage coupled to the server message authentication code generator, the storage to store the server secret key, and a shared secret key between the server and a client;
a client message authentication code validator coupled to the storage, the client message authentication code validator to validate the client message authentication code, when a request is received from the client; and
a session validator coupled to the client message authentication code validator, the session validator to validate a session with the client in view of the validity of the client message authentication code, wherein the session validator is to validate that the sequence number, the account identifier, and the server message authentication code in the request from the client have not been tampered with, and that the server has not previously processed a prior identical request from the client.

14. The server of claim 13 wherein the shared secret key between the server and the client is established over an insecure communication channel using an anonymous cryptographic key agreement protocol, wherein the server and the client have no prior knowledge of each other.

15. The server of claim 14 wherein the client message authentication code is computed over the sequence number, the request specific data using the shared secret key.

16. The server of claim 13 wherein the client message authentication code validator is to calculate a message authentication code in view of the shared secret and the sequence number, to compare the calculated message authentication code with the client message authentication code, and to determine the validity of the client in view of the comparison.

17. The server of claim 16 wherein the sequence number generator is to send a new sequence number upon successful validation of the client.

* * * * *